UNITED STATES PATENT OFFICE.

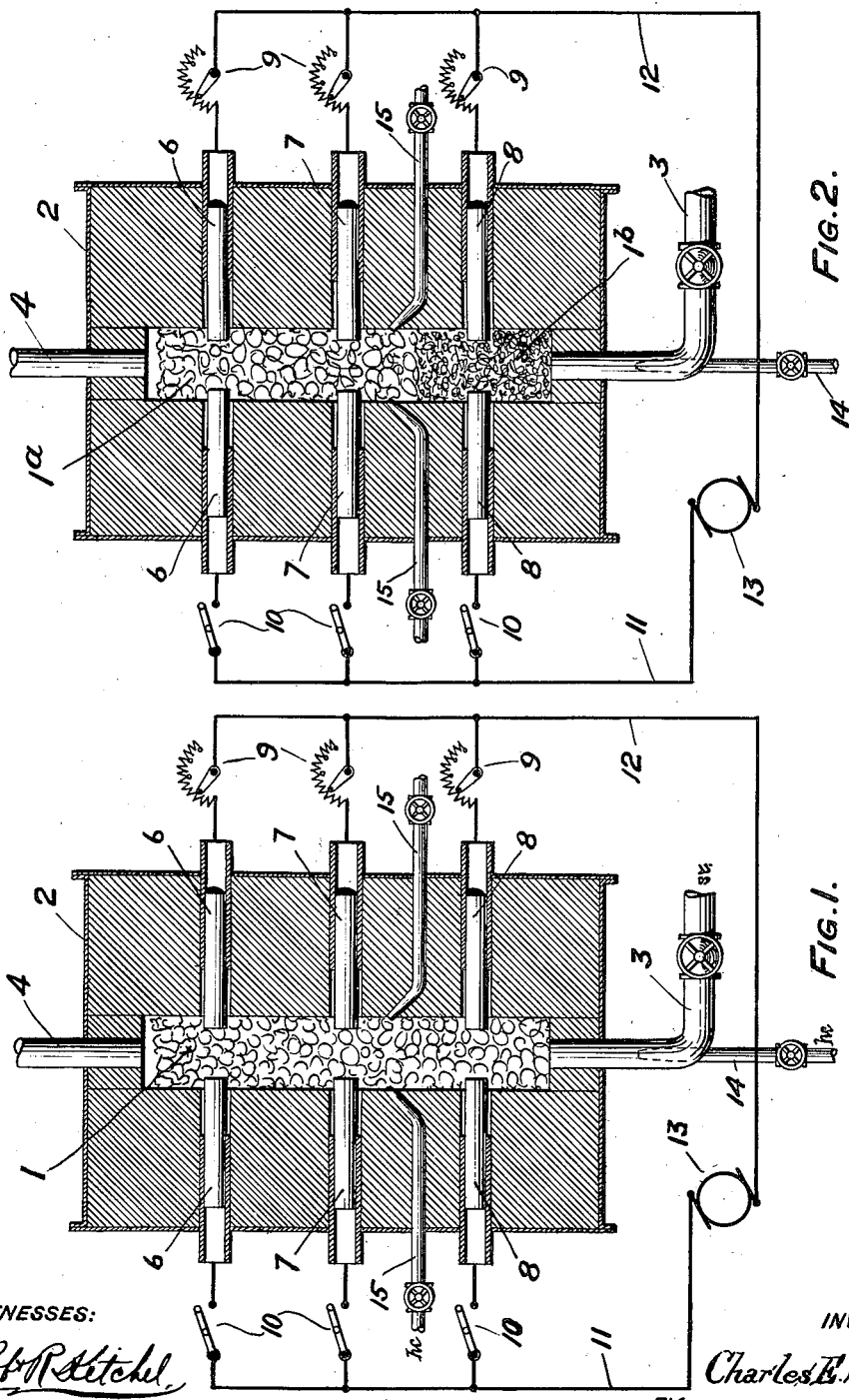

CHARLES E. WHITE, OF PHILADELPHIA, PENNSYLVANIA.

PROCESS OF MAKING WATER-GAS.

935,344.  Specification of Letters Patent.  Patented Sept. 28, 1909.

Application filed January 26, 1909.  Serial No. 474,209.

*To all whom it may concern:*

Be it known that I, CHARLES E. WHITE, a citizen of the United States, and a resident of Philadelphia, in the county of Philadelphia and State of Pennsylvania, have invented a certain new and useful Process of Making Water-Gas, of which the following is a specification.

The principal object of the present invention is to provide for the continuous production of water gas, either carbureted or not as desired, in a comparatively inexpensive, efficient and reliable manner.

To this and other ends hereinafter set forth the invention stated in general terms comprises the process which consists in electrically heating a mass of refractory material and at the same time passing steam or water through the same, with or without the introduction of a suitable hydrocarbon.

For the sake of a description of the invention reference may be made to the accompanying drawings, in which—

Figure 1, is a view principally in central section illustrating one form of apparatus by means of which the process can be practiced, and Fig. 2, is a similar view illustrating a modification.

In the drawings 1, is a mass of refractory material to which heat is continuously applied electrically. The refractory material is carbon or material of like character, coke being an example. The continuous application of heat is important because it permits of the continuous manufacture of gas, thereby enabling a comparatively small plant to produce more gas than it could do by the present method of intermittently blowing up a fire and then passing steam through it. Furthermore by electric heating the heat can be concentrated within the mass of refractory material with comparatively little loss, the only material loss being due to radiation. This mass of refractory material 1, is shown as contained within a suitable housing or casing 2.

3, are means consisting of a valved pipe for introducing steam or water vapor to the mass of refractory material and 4, is a pipe for taking off the gas generated.

6, 7, and 8, indicate electrodes by means of which and their connections, the mass of refractory material is electrically heated. Rheostats 9 are shown for controlling the application of the current to the electrodes. 10, are switches for cutting out any or all of the electrodes.

11 and 12, are conductors by means of which current is supplied from a suitable source as the generator 13.

14, is a valved connection by means of which hydrocarbon may be introduced along with the steam or water vapor and 15, are valved connections by means of which hydrocarbon vapor may be introduced to the mass of refractory material intermediate of its extent.

To practice the process by means of the described apparatus, current is continuously applied and it heats the mass of refractory material and keeps it heated to the proper temperature. Through this mass of refractory material, while heat is being electrically applied thereto, steam or water vapor is continuously passed, and in passing the steam or water vapor is decomposed and the resultant gas is led out as from the outlet 4. The heat of the refractory material may, since it is electrically applied, be accurately controlled. If desired hydrocarbon may be introduced by way of the connection 14 or 15, or both, and if desired, that part of the refractory material through which the hydrocarbon vapor or gas passes along with the gas already described, may be heated to a different temperature from the rest of the refractory material. For example, it may not be so highly heated. In other words, it is possible to so heat different portions of the mass of refractory material that the steam or water vapor is decomposed by a highly heated part of the mixture and the resulting gas along with hydrocarbon is passed through a portion of the refractory material which is not so highly heated. The heating of different parts of the refractory material to different temperatures may be accomplished by means of the current density at such parts, which can be controlled by means of the rheostats, or this result can be accomplished by appropriately selecting different refractory material for the different zones. This arrangement is shown in Fig. 2, in which the refractory material $1^a$ is different from the refractory material $1^b$, in such particulars that the current density is different in the two portions; for example, the part $1^b$ may be hotter than the part $1^a$. The refractory material may consist of carbon as coke, and the required difference in conductivity may be attained by difference in the size of the particles of the two masses.

What I claim is:

1. The process of making water gas which consists in confining a mass of refractory material, heating portions of said mass to different temperatures by the application of different current densities thereto, and at the same time passing steam or water vapor through the heated mass of refractory material.

2. The process of making water gas which consists in confining a mass of refractory material, heating portions of said mass to different temperatures by the application of different current densities thereto, and passing water vapor or steam through the whole mass and hydrocarbon through a portion of the mass while being electrically heated.

In testimony whereof I have hereunto signed my name.

CHARLES E. WHITE.

Witnesses:
CLIFFORD K. CASSEL,
FRANK E. FRENCH.